US011967774B2

(12) United States Patent
Kohtani

(10) Patent No.: US 11,967,774 B2
(45) Date of Patent: Apr. 23, 2024

(54) ANTENNA ARRAY FOR HIGH FREQUENCY DEVICE

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventor: Masato Kohtani, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 0 days.

(21) Appl. No.: 17/833,952

(22) Filed: Jun. 7, 2022

(65) Prior Publication Data

US 2022/0407225 A1 Dec. 22, 2022

(30) Foreign Application Priority Data

Jun. 16, 2021 (JP) ................................ 2021-100206

(51) Int. Cl.
*H01Q 3/34* (2006.01)
*H01Q 1/32* (2006.01)
(Continued)

(52) U.S. Cl.
CPC ............. *H01Q 3/34* (2013.01); *H01Q 1/3233* (2013.01); *H01Q 3/2617* (2013.01); *H01Q 21/065* (2013.01)

(58) Field of Classification Search
CPC ........ H01Q 1/32; H01Q 1/3233; H01Q 21/00; H01Q 21/0025; H01Q 21/06;
(Continued)

(56) References Cited

U.S. PATENT DOCUMENTS 4,410,894 A * 10/1983 Gans ........................ H01Q 3/36 342/368
5,115,243 A * 5/1992 Perry ...................... G01S 13/87 342/158
(Continued)

FOREIGN PATENT DOCUMENTS

JP 2020-008740 A 1/2020

OTHER PUBLICATIONS

Morris Repeta et al., "A Scalable 256-Element E-Band Phased-Array Transceiver for Broadband Communications", We3F-4, IMS2020. (Huawei).

(Continued)

*Primary Examiner* — Tho G Phan
(74) *Attorney, Agent, or Firm* — POSZ LAW GROUP, PLC

(57) ABSTRACT

An antenna array for a high frequency device includes a plurality of antenna elements used for a radar device and arranged in a two-dimensional array in a predetermined area. The plurality of antenna elements includes grouped on-elements and single on-elements with specific distance for grating lobe cancellation, each of them is electrically connected to a phase shifter. The on-elements are arranged such that density of the on-elements at a center portion in the two-dimensional array is high and density of the on-elements at four corners in the two-dimensional array is low.

18 Claims, 16 Drawing Sheets

(51) Int. Cl.
*H01Q 3/26* (2006.01)
*H01Q 21/00* (2006.01)
*H01Q 21/06* (2006.01)

(58) Field of Classification Search
CPC .......... H01Q 21/065; H01Q 3/24; H01Q 3/26; H01Q 3/2611; H01Q 3/2617; H01Q 3/34; H01Q 3/36
See application file for complete search history.

(56) References Cited

U.S. PATENT DOCUMENTS

| | | | | |
|---|---|---|---|---|
| 8,031,116 | B1 * | 10/2011 | Lee | H01Q 1/3233 342/372 |
| 8,773,306 | B2 * | 7/2014 | Milano | H01Q 1/246 342/368 |
| 10,573,959 | B2 * | 2/2020 | Alland | H01Q 3/28 |
| 11,217,897 | B1 * | 1/2022 | West | H01Q 3/385 |
| 11,462,837 | B2 * | 10/2022 | Kuwabara | H01Q 21/065 |
| 2011/0109526 | A1 | 5/2011 | Bauza et al. | |
| 2017/0207547 | A1 | 7/2017 | Zhai et al. | |
| 2021/0066813 | A1 * | 3/2021 | Salman | H01Q 3/2617 |
| 2022/0107408 | A1 | 4/2022 | Kohtani | |

OTHER PUBLICATIONS

V. Rabinovich and N. Alexandrov, "Antenna Arrays and Automotive Applications: Springer", 2013.

* cited by examiner

FIG. 13

| MAIN BEAM ANGLE | GRATING LOBE GENERATION ANGLE | FIRST NULL FILTER ANGLE | SECOND NULL FILTER ANGLE |
|---|---|---|---|
| 0° | — | — | — |
| 5° | −60.5° | −66° | −66° |
| 10° | −53° | −56° | −57° |
| 17.5° | −43° | −45° | −45° |
| 25° | −34.5° | −35° | −35° |
| 40° | −20.5° | −21° | −21° |

ANTENNA ARRAY FOR HIGH FREQUENCY DEVICE

CROSS REFERENCE TO RELATED APPLICATIONS

This application is based on Japanese Patent Application No. 2021-100206 filed on Jun. 16, 2021, the disclosure of which is incorporated herein by reference.

TECHNICAL FIELD

The present disclosure relates to an antenna array for a high frequency device.

BACKGROUND

Array antennas for high frequency devices have been proposed. For example, in a phased array antenna, individual array elements are arranged two-dimensionally, and the individual array elements are arranged in units of eight. The individual array elements may be grouped as 4×2 and 8×1 square sub-array. The plurality of square sub-arrays are tiling so as to break periodicity of a phase center, thereby reducing grating lobe.

SUMMARY

The present disclosure provides an antenna array for a high frequency device that includes a plurality of antenna elements used for a radar device and arranged in a two-dimensional array in a predetermined area. The plurality of antenna elements includes on-elements electrically connected to a phase shifter. The on-elements are arranged such that density of the on-elements at a center portion in the two-dimensional array is high and density of the on-elements at four corners in the two-dimensional array is low.

BRIEF DESCRIPTION OF DRAWINGS

The features and advantages of the present disclosure will become more apparent from the following detailed description made with reference to the accompanying drawings. In the drawings:

FIG. 13 is a diagram showing a transition of a grating lobe generation angle when the main beam angle is changed from 0° to 40° in E-plane, and a simulation result of null angles at several scan angles for two types of null filters used in the antenna array according to the first embodiment.

DETAILED DESCRIPTION

Figure 1:
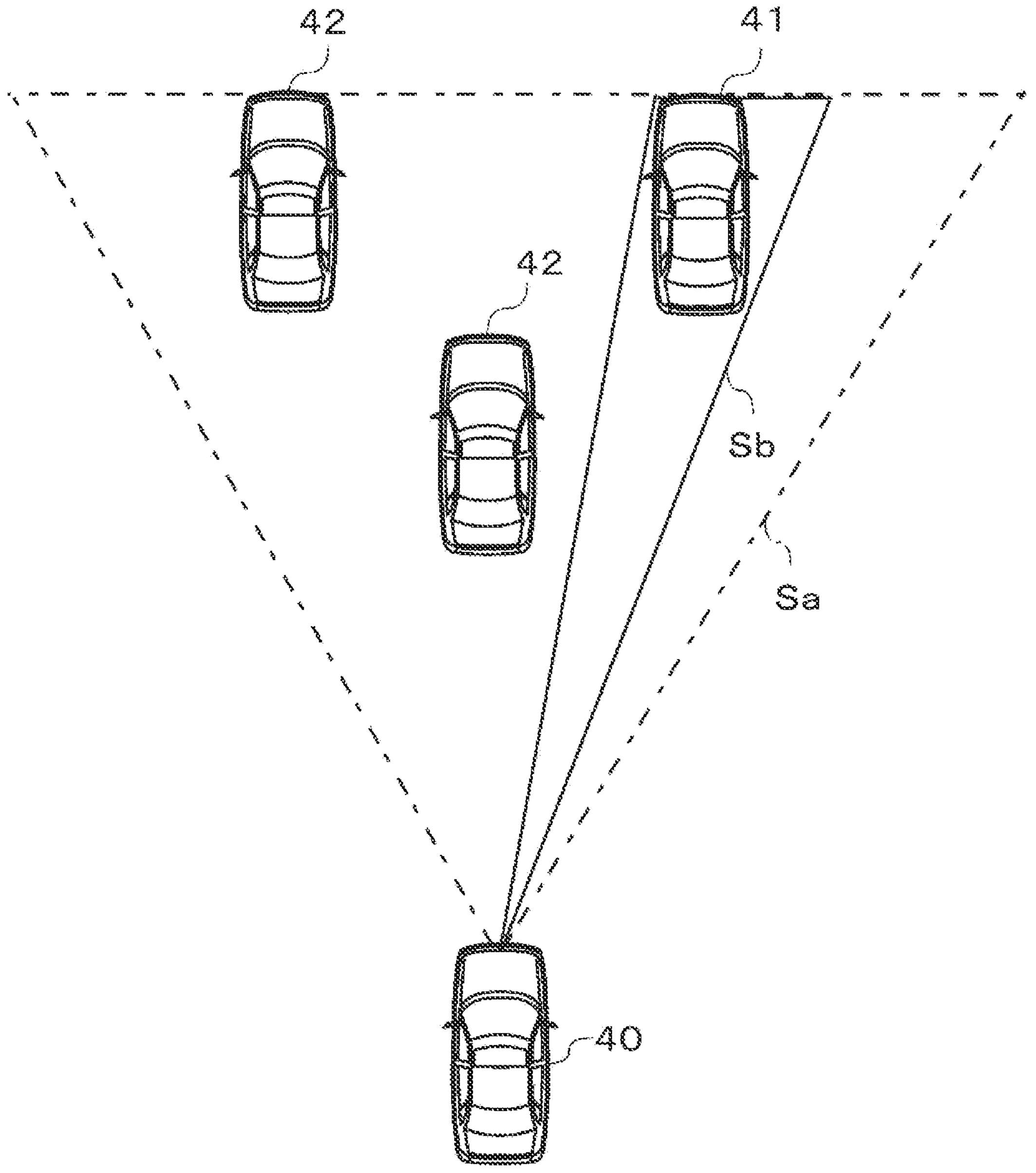
FIG. 1 is a diagram for explaining a real beam and a virtual beam in a hybrid radar according to a first embodiment.

For example, periodicity of a phase center is broken in order to suppress a grating lobe. However, on the contrary, due to the reduction of the periodicity of the phase center, all the phase centers are irregularly shifted from element coordinates, which complicates the calculation of the phase value and the calculation of tapering.

That is, when the off-grid increases in the phase center position in both the vertical and horizontal directions, the distance between adjacent elements changes from the ideal distance of 0.5λ, and there is no premise, which complicates the calculation of the phase value. The inventor also found that by grouping adjacent individual array elements vertically or horizontally to reduce the number of phase shifters and simplify the system, a grating lobe is generated during scan in the vertical or horizontal direction same as the grouping direction. On the other hand, for example, in a scan-type radar sensor, in order to reduce costs and simplify the system, it is particularly required to reduce the number of phase shifters electrically connected to the on-element of the phased array.

The present disclosure provides an antenna array for a high frequency device capable of suppressing generation of grating lobes (and side lobes, and the like) while reducing the number of phase shifters.

An exemplary embodiment of the present disclosure provides an antenna array for a high frequency device that includes a plurality of antenna elements used for a radar device and arranged in a two-dimensional array in a predetermined area. The plurality of antenna elements includes on-elements electrically connected to a phase shifter. The on-elements are arranged such that density of the on-elements at a center portion in the two-dimensional array is high and density of the on-elements at four corners in the two-dimensional array is low.

In the exemplary embodiment of the present disclosure, since the number of on-elements can be reduced, the number of phase shifters electrically connected to the on-elements can also be reduced. Moreover, since the density of the on-elements is high at the center and low at the four corners, it is possible to suppress the generation of unnecessary side lobes and the like.

Hereinafter, some embodiments in which an antenna array for a high frequency device is used for a radar device 1 will be described with reference to the drawings. In each of the embodiments described below, the same or similar reference numerals are attached to the same or similar configuration, and the description is omitted as necessary.

First Embodiment

A first embodiment will be described with reference to FIGS. 1 to 13. The radar device 1 is attached to a front end of a vehicle 40 as illustrated in FIG. 1, and is used for a long range radar (LRR) application that scans a predetermined range about several hundred meters ahead of the vehicle. The radar device 1 may be attached to a plurality of places on the front, rear, left and right of the vehicle 40.

Figure 2:
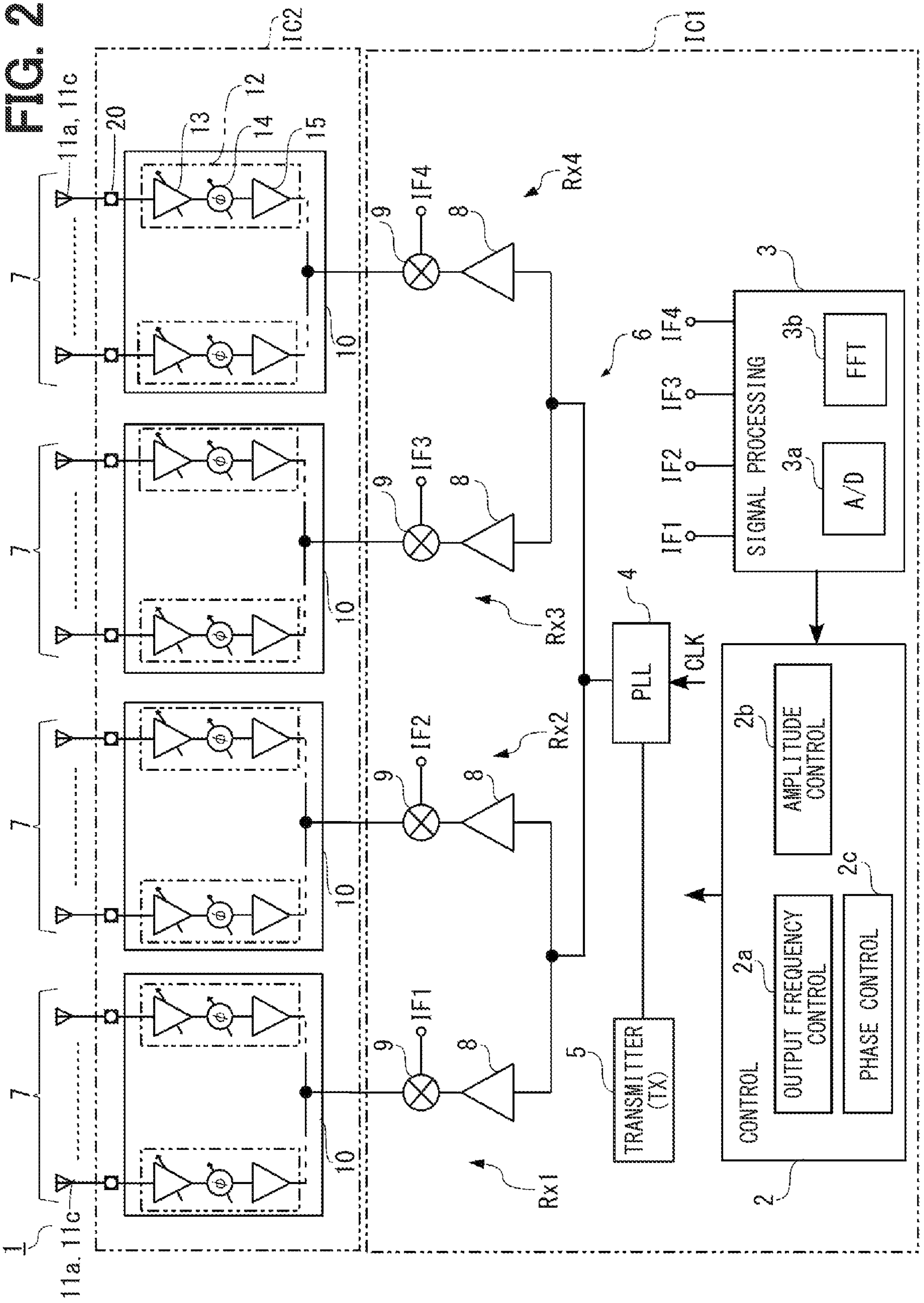
FIG. 2 is an electrical configuration diagram showing a hybrid radar device according to the first embodiment.

The vehicle radar device 1 illustrated in FIG. 2 mainly includes a transceiver integrated circuit IC1 and a phase shifter integrated circuit IC2. The radar device 1 calculates the distance to a target, the existence angle, and the like by synthesizing signals of receiver (RX) channels. The number of the RX channels is 4. In the following example, the number of transmitter (TX) channels is 1, the number of RX channels is 4, and the RX channels are coded as Rx1, Rx2, Rx3, and Rx4. However, the number of RX channels n may be any number more than two.

Figure 3:
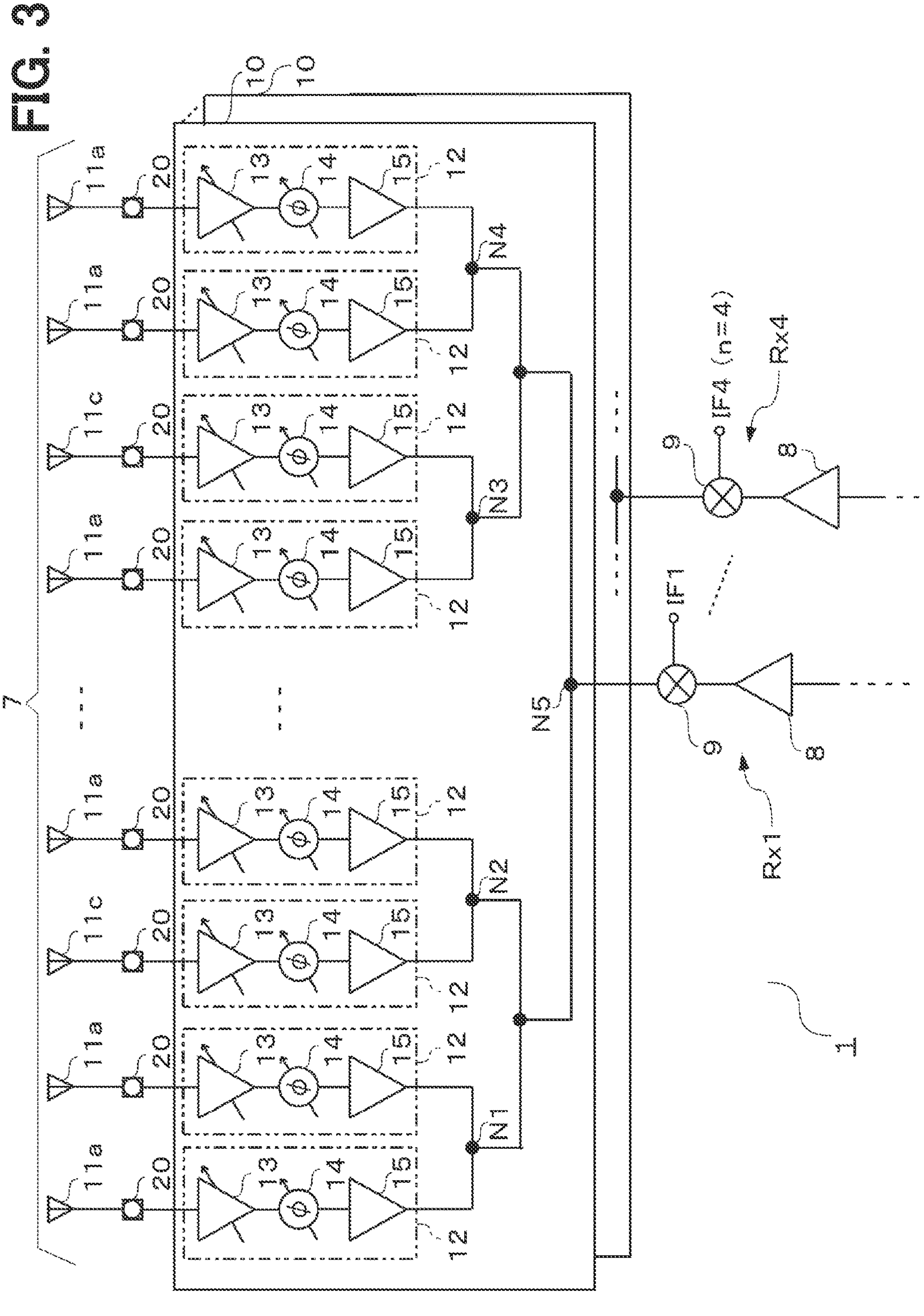
FIG. 3 is an electrical configuration diagram showing a plurality of receiver antenna arrays connected to phase shifters and down-converters according to the first embodiment.

The phase shifter integrated circuit IC2 includes a RX phase shift unit 10 for each of the RX channels Rx1 to Rx4. An antenna array 7 for a high frequency device (hereinafter, abbreviated as an antenna array 7) is connected to each of the RX phase shift unit 10. As shown in FIG. 3, the antenna array 7 is used as a phased array antenna. The antenna array 7 is configured by combining on-elements 11*a* and 11*c* electrically connected to the phase shifter integrated circuit IC 2 and an off-element 11*b* and a dummy element 11*d* not electrically connected to the phase shifter integrated circuit IC 2. Details will be described later.

As shown in FIG. 2, the RX phase shift unit 10 is connected to an IC pad 20. The on-elements 11*a* and 11*c* constituting the antenna array 7 are connected to the corresponding IC pads 20 via PCB wirings. Further, the RX phase shift unit 10 includes a variable gain amplifier 13, a phase shifter 14, and an amplifier 15 as a high frequency unit 12.

In the RX phase shifter IC10, when a signal is received from the antenna array 7 through the IC pad 20, the variable gain amplifier 13 amplifies the signal received from the antenna array 7, the phase shifter 14 shifts the phase of the amplified signal of the variable gain amplifier 13 by a phase shift value φ, the amplifier 15 amplifies the phase shift signal of the phase shifter 14, and outputs the signal to a mixer 9. By configuring the variable gain amplifier 13 between the antenna array 7 and the phase shifter 14, the trade-off between the NF and the distortion performance on the system of the radar device 1 can be improved according to the application. For example, a high gain setting (NF minimum) improves the detection capability of a long-distance target, and a low gain setting makes it possible to alleviate saturation when detecting a short-distance target.

In the configuration example of FIG. 3, which more specifically shows the connection of FIG. 2, the RX phase shift unit 10 of the RX channels Rx1 to Rx4 processes the signal received from the antenna array 7 and then synthesizes the signals through the nodes N1 to N5 to output to the mixer 9. The node N1 synthesizes the received signals received from the two on-elements 11*a*. The node N2 synthesizes the received signals received from the two on-elements 11*a* and 11*c*.

The node N3 in FIG. 3 synthesizes the received signals received from the two on-elements 11*a* and 11*c*. The node N4 synthesizes the received signals received from the two on-elements 11*a*. At node N5, the signals obtained through nodes N1 to N4 are combined and output to the mixer 9. The line lengths from the on-elements 11*a* and 11*c* to the mixer 9 may be configured to be equal length paths to each other.

On the other hand, as shown in FIG. 2, the transceiver integrated circuit IC 1 is configured as a block in a control unit 2, a signal processing unit 3, a PLL 4, a TX unit 5, and a RX unit 6. The control unit 2 of the transceiver integrated circuit IC 1 executes various control functions such as the output frequency control unit 2*a*, the amplitude control unit 2*b*, and the phase control unit 2*c* by executing a predetermined control logic. The output frequency control unit 2*a* controls the output frequency of the PLL 4. The phase control unit 2*c* controls the phase shift value e of the phase shifter 14 in the phase shifter integrated circuit IC2. The amplitude control unit 2*b* controls the amplitude of the variable gain amplifier 13 in the phase shifter integrated circuit IC2. The control unit 2 controls the RX beam scanning angles of the RX channels Rx1 to Rx4 by controlling the phase shift value φ of the phase shifter 14 of each RX channel Rx1 to Rx4 using the phase control unit 2*c*.

The RX unit 6 includes an LO amplifier 8 and a mixer 9, and is connected to a RX phase shift unit 10 of the phase shifter integrated circuit IC2. The PLL 4 uses a reference clock CLK input from a reference oscillation circuit (not shown), and by adjusting parameters such as a multiple of the reference clock CLK, outputs a local signal (having, for example, 77 GHz) in the millimeter wave band having the same frequency to the mixer 9 in all RX channels Rx1 to Rx4. The mixer 9 can obtain an IF output having a frequency proportional to the distance by mixing the local signal and the signal received by reflecting the radio wave output from the TX unit 5 on the target. Although not described here, a multiplier may be provided to multiply the frequency to a desired frequency, and then the local signal may be output to each RX channel Rx1 to Rx4.

The LO amplifier 8 amplifies the local signal of the PLL 4 with a predetermined amplitude and outputs it to the mixer 9 in each RX channel Rx1 to Rx4. The mixer 9 of each RX channel Rx1 to Rx4 inputs and mixes the output signal of the RX phase shift unit 10 of each RX channel Rx1 to Rx4 and the local signal amplified by the LO amplifier 8 as IF signals IF1 to IF4.

Since the same PLL 4 supplies the local signal to the mixer 9 of all the RX channels Rx1 to Rx4, the IF signal has a high correlation with the frequency variation of the reference clock CLK and the frequency characteristic change with respect to the external environment variation.

Further, the mixer 9 of each RX channel Rx1 to Rx4 outputs the output signal of each mixer 9 to the signal processing unit 3. The signal processing unit 3 includes a processor and a predetermined electronic control logic, and can estimate the angle of a target existing in a sector in which the field of view is narrowed by signal processing such as digital beam forming (DBF).

The signal processing unit 3 inputs the IF signal processed by the mixer 9 to the A/D converter 3*a* via an IF filter (not shown). The A/D converter 3*a* converts the IF signal into the digital data by an analog-digital conversion process. The signal processing unit 3 performs predetermined digital signal processing by the FFT 3*b*, and, as shown in FIG. 1, measures the distance from the subject vehicle 40 to the other vehicle 41, the relative speed with the vehicle 41, and the existence angle of the vehicle 41.

Figure 4:
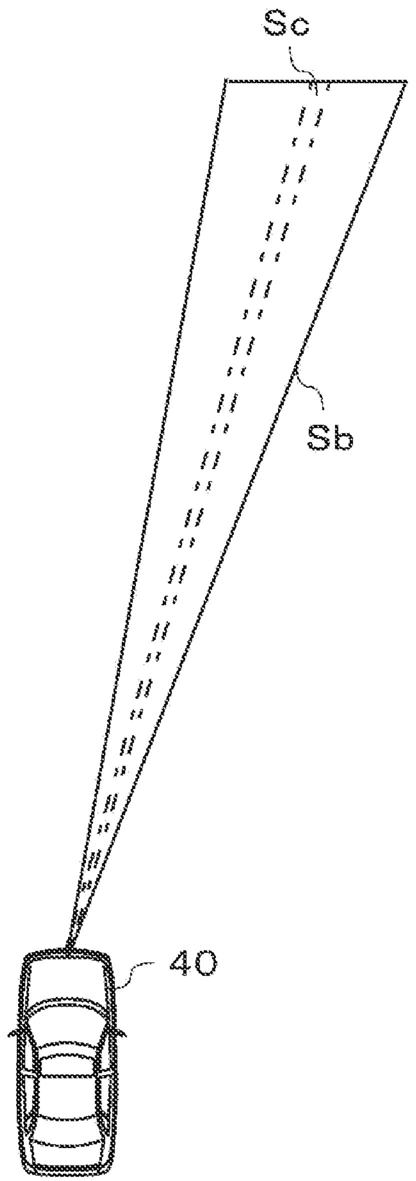
FIG. 4 is a diagram for explaining the real beam and the virtual beam according to the first embodiment.

The signal processing unit 3 narrows the field of view into the sector region Sb shown in FIG. 1 by analog beamforming using the phase shifter 14. By executing signal processing by the DBF algorithm, the signal processing unit 3 forms a narrow virtual beam Sc in the sector region Sb as shown in FIG. 4, and identifies the vehicle 41 with higher resolution as a scanning target. As a result, the other vehicle 42 can be excluded from the scanning target. Further, it is also possible to apply a multi-signal classification process (MUltiple Signal Classification, i.e., MUSIC) or the like, which can obtain a higher resolution than the DBF described above, for a plurality of targets.

For example, as illustrated in FIGS. 1 and 4, the signal processing unit 3 uses the DBF algorithm to narrow the field of view to the sector area Sb instead of the entire wide angle field of view Sa, and acquires a virtual beam Sc for each sector area Sb. Therefore, the vehicle 41, which is a target, can be identified with high resolution in the narrow sector area Sb. Since the field of view can be narrowed down to the sector area Sb, the amount of calculation can be reduced compared to the conventional MIMO radar. Thus, the hybrid method is an efficient scanning method that eases the trade-off between shortened scanning time and high resolution capability.

Hereinafter, a structure of the antenna array 7 used in such a radar device 1 will be described. Since the structures of the antenna array 7 for the TX unit 5 and the RX unit 6 are the same, the antenna array 7 connected to the RX unit 6 will be described below.

Figure 5:
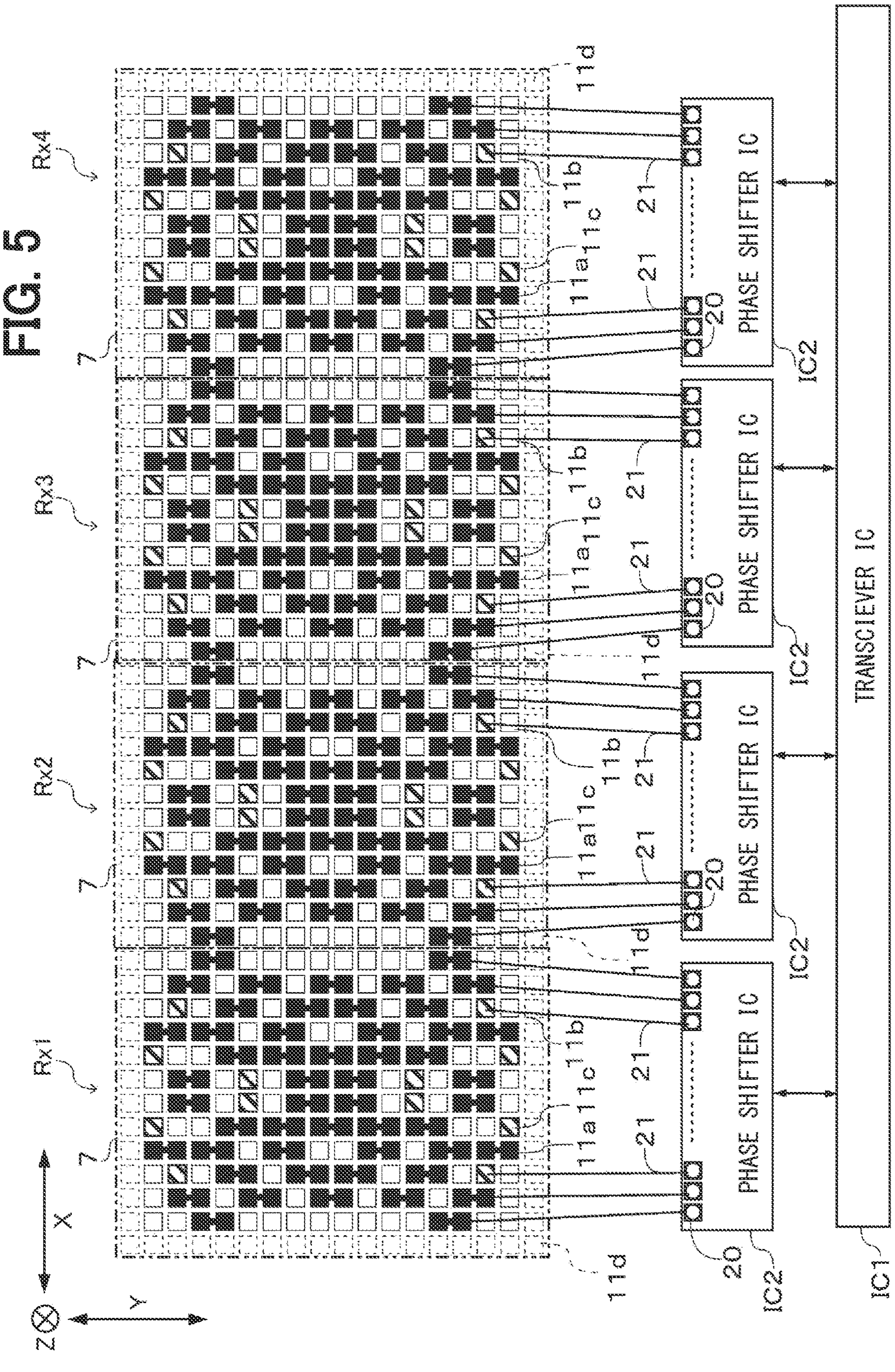
FIG. 5 is a diagram schematically showing an arrangement of receiver antenna arrays with phase shifter ICs, and transceiver ICs having a plurality of mixers in a hybrid radar architecture according to the first embodiment.
Figure 6:
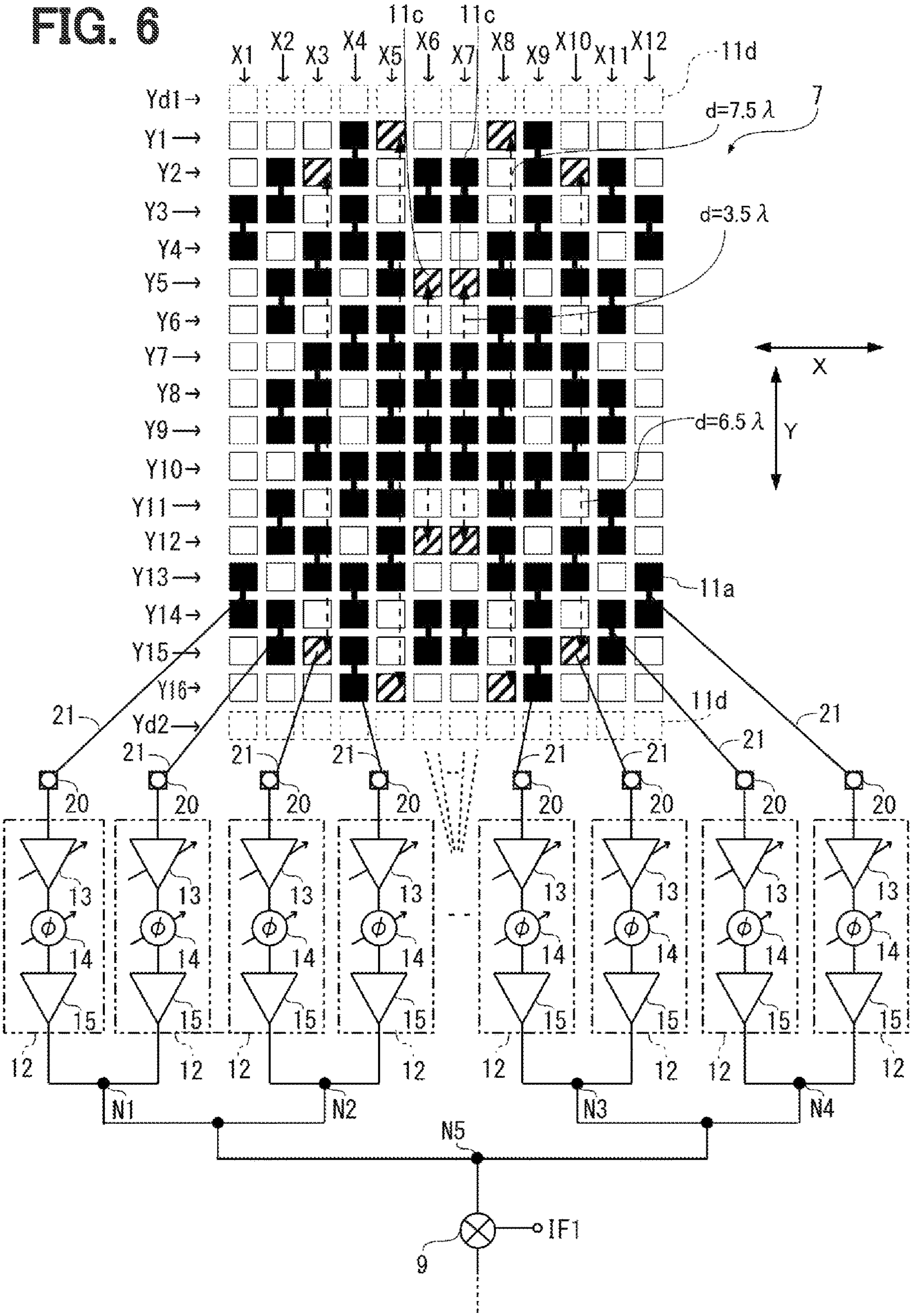
FIG. 6 is a diagram schematically showing an arrangement of on-elements in an antenna array and connection of phase shifters and a down-converter according to the first embodiment.

As shown in FIGS. 5 and 6, the antenna array 7 of each RX channel Rx1 to Rx4 is configured by arranging elements 11*a* to 11*d* made as metal rectangular surfaces in regions partitioned in a lattice pattern. The outer frame of the antenna array 7 is formed in a rectangular shape, and rectangular elements 11*a* to 11*d* are arranged in the region of the lattice-shaped vertices in the outer frame of the antenna array 7. In this embodiment, as shown in FIG. 5 or 6, effective elements are arranged in a two-dimensional array region divided into 16 rows and 12 columns.

In the present embodiment, as shown in FIG. 5 or 6, in each antenna array 7, eighteen elements 11*a* to 11*d* are arranged side by side in the lattice partition region along the long side in the Y direction, and fourteen elements 11*a* to 11*d* are arranged side by side in the lattice partition region along the short side in the X direction. Further, the distance between the adjacent elements 11*a* to 11*d* is set to one half of the radar wavelength A, and the shape of each of the elements 11*a* to 11*d* is formed in a rectangular shape. The antenna array 7 is arranged in the XY plane and emits a beam in the +Z axis direction orthogonal to the XY plane. As shown in FIG. 5, the antenna array 7 having a basic array of 16×12 is continuously arranged in the X-axis direction so as to be connected to the four RX channels Rx1 to Rx4. In other words, in the hybrid system, for example, 16×48 antenna arrays are divided into 16×12 antenna arrays 7 for N, and IF signal processing is performed for N using the N RX mixers. In this embodiment, an example of N=4 is described.

As described above, the antenna array 7 includes on-elements 11*a* and 11*c*, off-elements 11*b*, and dummy elements 11*d*. The on-element 11*a* is an element that is electrically connected to the phase shifter integrated circuit IC2 in a pair of the on-elements 11*a* adjacent to each other in the Y direction. The on-element 11*c* is an element that is electrically connected to the phase shifter integrated circuit IC2 in a pair of the on-elements 11*c* separated with each other in the Y direction. Therefore, the on-elements 11*a* and 11*c* are shown having different reference numerals. The filled areas in FIGS. 5 and 6 indicate the on-element 11*a*, and the on-element 11*c* is shown with hatches. The off-element 11*b* is shown by a solid line frame, and the dummy element 11*d* is shown by a broken line frame.

Dummy elements 11*d* are arranged on the outermost circumference of the two-dimensional array of the antenna array 7. The dummy element 11*d* is not connected to the RX phase shift unit 10 like the off-element 11*b*. Since the dummy element 11*d* is arranged on the outermost circumference of the two-dimensional array, the quality of the TX and RX signal using the antenna array 7 can be improved.

In the configuration of the present embodiment, if the on-elements 11*a* are arranged at the vertex of the inner grid excluding the dummy element 11*d* of the outermost frame, 16×12=192 on-elements 11*a* can be arranged in total. However, it is not preferable to arrange the on-elements 11*a* at all the vertexes of the lattice since the phase shift control is complicated in a case where all the on-elements 11*a* are controlled by the phase shifter integrated circuit IC2. Therefore, in this embodiment, the number of on-elements 11*a* and 11*c* to be phase-shift controlled is reduced by devising the two-dimensional arrangement of the on-elements 11*a* and 11*c* and the off-element 11*b*, and the phase shift control is further simplified.

In the following description, as shown in FIG. 6, the rows of the individual antenna array 7 are referred to as rows X1 to X12. Further, both ends of the Y row in which the dummy element 11*d* is arranged are referred to as rows Yd1 and Yd2, and the rows between them are referred to as rows Y1 to Y16. When the arrangement area of the elements 11*a* to 11*d* is shown, it is represented by the notation of coordinates (X, Y). Further, for example, when the on-element 11*a* in row Y3 and the on-element 11*a* in row Y4 are electrically connected and grouped, the grouping is indicated by a minus sign as in "Y3-Y4".

As shown in FIG. 6, a large number of IC pads 20 and a pair of on-elements 11*a* and a pair of on-elements 11*c* of the antenna array 7 are connected by a TX line 21 using a printed wiring board, whereby signals from the on-elements 11*a* and 11*c* can be received. An example of arranging the elements 11*a* to 11*d* will be described with reference to FIG. 6.

As shown in FIG. 6, in the antenna array 7, the center of the row is located between the rows Y8 and Y9, and the center of the column is located between the columns X6 and X7. The on-elements 11*a* are arranged symmetrically in the vertical direction with respect to the center of the row and symmetrically in the horizontal direction with respect to the center of the column. Further, the on-elements 11*a* are arranged so as to be point-symmetrical with respect to the central of the antenna array 7.

Specifically, in the antenna array 7, the on-elements 11*a* in the left half region shown in FIG. 6 are arranged symmetrically in the vertical direction at coordinates (X1, Y3-Y4) and coordinates (X1, Y13-Y14),
coordinates (X2, Y2-Y3) and coordinates (X2, Y14-Y15),
coordinates (X2, Y5-Y6) and coordinates (X2, Y11-Y12),
coordinates (X2, Y8-Y9),
coordinates (X3, Y4-Y5) and coordinates (X3, Y12-Y13), and
coordinates (X3, Y7-Y8) and coordinates (X3, Y9-Y10).

Further, the on-elements 11*a* are arranged symmetrically in the vertical direction at coordinates (X4, Y1-Y2) and coordinates (X4, Y15-Y16),
coordinates (X4, Y3-Y4) and coordinates (X4, Y13-Y14),
coordinates (X4, Y6-Y7) and coordinates (X4, Y10-Y11),
coordinates (X5, Y4-Y5) and coordinates (X5, Y12-Y13),
coordinates (X5, Y6-Y7) and coordinates (X5, Y10-Y11),
coordinates (X5, Y8-Y9),
coordinates (X6, Y2-Y3) and coordinates (X6, Y14-Y15), and
coordinates (X6, Y7-Y8) and coordinates (X6, Y9-Y10).

Further, in the antenna array 7, the on-elements 11*a* in the right half region shown in FIG. 6 are arranged symmetrically in the vertical direction at coordinates (X12, Y3-Y4) and coordinates (X12, Y13-Y14),
coordinates (X11, Y2-Y3) and coordinates (X11, Y14-Y15),
coordinates (X11, Y5-Y6) and coordinates (X11, Y11-Y12),
coordinates (X11, Y8-Y9),
coordinates (X10, Y4-Y5) and coordinates (X10, Y12-Y13).
coordinates (X10, Y7-Y8) and coordinates (X10, Y9-Y10).

Further, the on-elements 11*a* are arranged symmetrically in the vertical direction at coordinates (X9, Y1-Y2) and coordinates (X9, Y15-Y16),
coordinates (X9, Y3-Y4) and coordinates (X9, Y13-Y14),
coordinates (X9, Y6-Y7) and coordinates (X9, Y10-Y11),
coordinates (X8, Y4-Y5) and coordinates (X8, Y12-Y13),
coordinates (X8, Y6-Y7) and coordinates (X8, Y10-Y11),
coordinates (X8, Y8-Y9),
coordinates (X7, Y2-Y3) and coordinates (X7, Y14-Y15), and
coordinates (X7, Y7-Y8) and coordinates (X7, Y9-Y10).

The grouping direction of the on-elements 11*a* is the Y direction and is not grouped in the X direction. Therefore, the on-elements 11*a* can be arranged without generating a grating lobe along the X direction, which tends to occur if the grouping is performed since the horizontal on-elements are placed with an ideal half lambda pitch without any grouping.

A connection center portion to which the pair of on-elements 11*a* are connected is defined as a RX feeding point for the transmission line 21, and the phase center of the grouped pair of on-elements 11*a* is located at the connection center portion. The transmission line 21 is configured by using the wiring configured on the printed circuit board. The line lengths of the transmission lines 21 connecting the IC pad 20 and each of the pairs of on-elements 11*a* may be equal to each other or relationship of p×λ (where p is an integer) to each other in order to align the phase for all channels. This configuration makes it easy to design the arrangement of the on-elements 11*a* in the antenna array 7.

Further, as shown in FIG. 6, the on-elements 11*c* are also arranged in the antenna array 7, but each one of the on-elements 11*c* is sandwiched between the off-elements 11*b* in the Y direction so as to be separated from each other. Two single on-elements 11*c* are arranged apart from each other in the same direction as the Y direction in which the on-elements 11*a* are grouped, and are arranged line-symmetrically with respect to the center of the row.

The on-elements 11*c* are provided in a pair at coordinates (X6, Y5) and coordinates (X6, Y12). The on-elements 11*c* are provided in a pair at coordinates (X7, Y5) and coordinates (X7, Y12). The distance between the centers of the on-element 11*c* of row Y5 and the on-element 11*c* of row Y12 is 3.5λ. These on-elements 11*c*, which are separate for 3.5λ, function as first null filters (steerable null filter).

The on-elements 11*c* are provided in a pair at coordinates (X5, Y1) and coordinates (X5, Y16). Similarly, the on-elements 11*c* are provided in a pair with coordinates (X8, Y1) and coordinates (X8, Y16). The distance between the centers of the on-element 11*c* of row Y1 and the on-element 11*c* of row Y16 is 7.5λ. These on-elements 11*c*, which are separate for 7.5λ, function as second null filters.

The on-elements 11*c* are provided in a pair at coordinates (X3, Y2) and coordinates (X3, Y15). Similarly, the on-elements 11*c* are provided in a pair with coordinates (X10, Y2) and coordinates (X10, Y15). Since the row-to-row distance or column-to-column distance between adjacent elements 11*a* to 11*d* is 0.5λ, the distance between the centers of the on-element 11*c* of row Y3 and the on-element 11*c* of row Y15 is 6.5λ. These on-elements 11*c*, which are separate for 6.5λ, function as third null filters.

As described above, the on-element 11*c* is arranged as a single element apart from each other, and the distance between the centers of the on-elements 11*c* is set to the specific distance of (0.5+m) λ (where m is an integer). That is, the on-elements 11*c* are line-symmetrically arranged from the center of the row of the antenna array 7 at an interval of (0.5+m) λ (m=1, 2, . . . ). Further, in order to increase the density of the on-elements 11*a* and 11*c* in the central portion, it is desirable to set m to equal to or more than three. By setting m to equal to or more than three, the effective element in the central portion of the antenna array 7 can be made dense for better sidelobe performances, and a measure for side lobes can be performed. Note that FIG. 6 shows an example of m=3, 6 and 7. Further, in order to change the characteristic of the null filter, it is desirable to provide a plurality of sets of on-elements 11*c* in the antenna array 7 which satisfy conditions in which the values of m are different from each other. Since the grating lobe also has an angular width, it is possible to suppress the grating lobe having an angular width by superimposing null filters having different damping characteristics in the vicinity of the angle where the grating lobe is generated.

Figure 7:
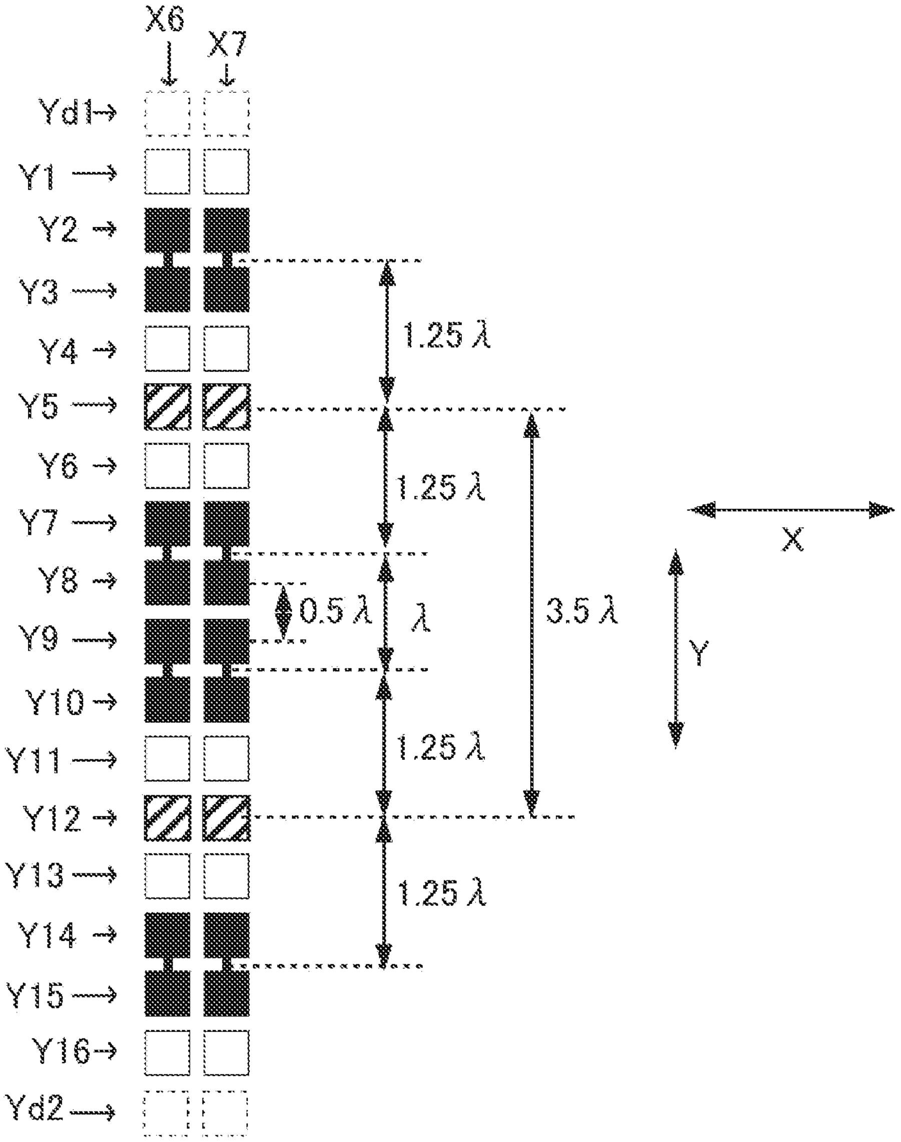
FIG. 7 is a diagram showing dimension of the on-element arrangement according to the first embodiment.

FIG. 7 shows the element arrangements of columns X6 and X7 extracted. The on-elements 11*a* of the rows Y7-Y8 adjacent to each other in the Y direction are controlled so that the phase shift value φ by the phase shifter 14 is the same. Therefore, the phase center of the on-elements 11*a* of the rows Y7-Y8 is an intermediate position between the rows Y7-Y8. Since the same signal is given to the on-elements 11*a* of rows the Y9-Y10, the phase center of the on-elements 11*a* of the rows Y9-Y10 is an intermediate position between the rows Y9-Y10.

Figure 8:
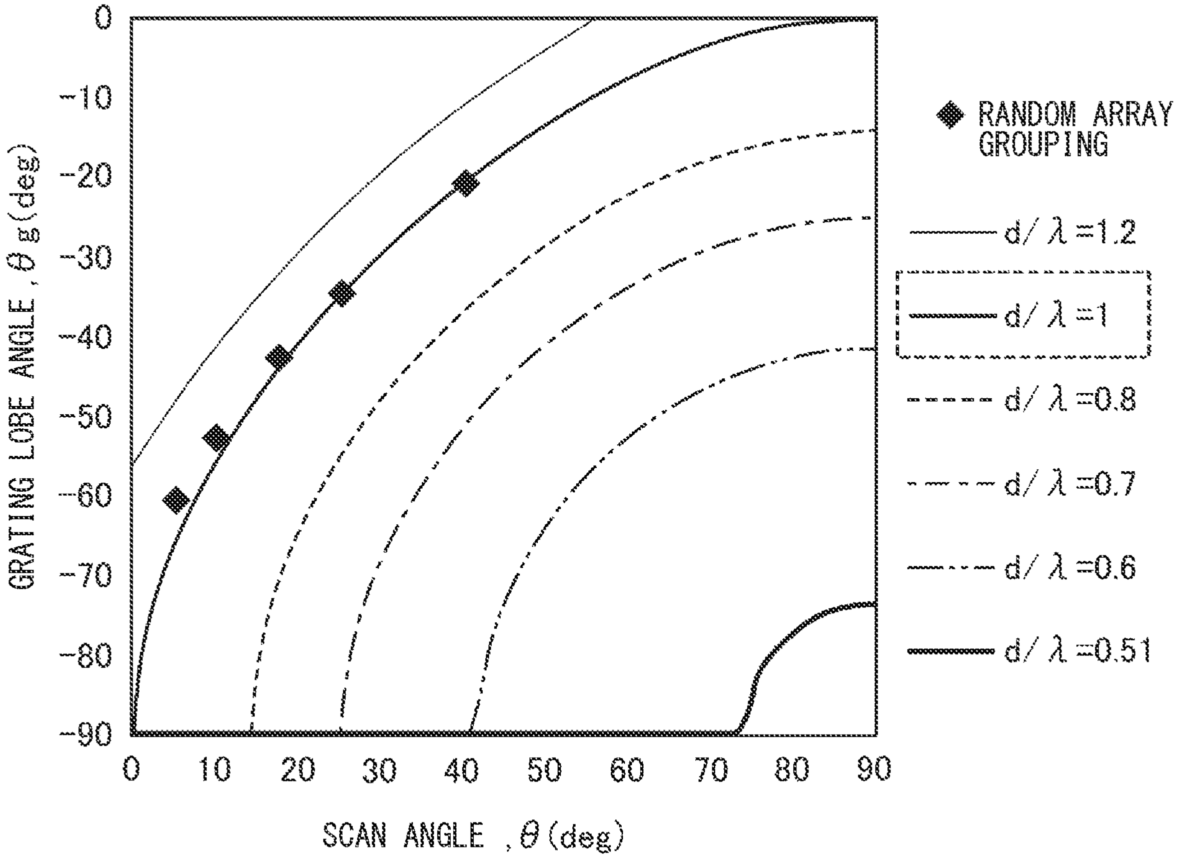
FIG. 8 is an explanatory diagram showing a theoretical calculation plot on grating lobe angle vs. scan angle with different values of d/A, being simultaneously plotted with simulated grating lobe angle at several scan angles in an ideal Uniform Rectangular Array (URA) with vertical grouping of adjacent elements.

Since the distance between the elements of the rows Y7-Y8 and the rows Y9-Y10 is λ/2, the phase center distance d of the on-elements 11*a* in the rows Y7-Y8 and the rows Y9-Y10 is λ that is twice of λ/2. FIG. 8 plots a theoretical calculation on grating lobe angle vs. scan angle with different values of d/λ, being simultaneously plotted with simulated grating lobe angle at several scan angles in an ideal URA (Uniform Rectangular Array) with vertical grouping of adjacent elements. As shown in FIG. 8, the relationship of the grating lobe generation angle between the phase center spacing d and the radar wavelength λ is equivalent to that in the case of designing with d=1λ.

As a result, there is a difficulty that the grating lobe will be strongly generated in principle. This is a phenomenon caused by grouping adjacent elements in the Y direction in order to reduce the number of phase shifters 14, but as described above, by arranging a single element 11*c* as shown in FIG. 7, the phase center distance d can be formed to be about 1.25λ, and the λ periodicity of the phase center spacing d can be broken. As a result, the grating lobe can be reduced by several dB. Further, the on-element 11*c* has an attenuation characteristic as a steerable null filter and can follow and suppress the grating lobe.

In other words, the pair of adjacent on-elements 11*a* are arranged line-symmetrically in the Y direction in the antenna array 7, and a single on-element 11*c* is arranged by being sandwiched between the off-elements 11*b* on the both sides of the Y direction. Therefore, even if the adjacent on-elements 11*a* are grouped in a pair, the periodicity of the phase center can be broken.

Further, the arrangement position of the single on-element 11*c* will be further paraphrased and described. The on-elements 11*c* are arranged point-symmetrically with respect to the center of the antenna array 7 at vertexes of a two-dimensional quadrangle. The vertexes of the quadrangle indicate, for example:

- a pair of coordinates (X6, Y5) and coordinates (X6, Y12) and a pair of coordinates (X7, Y5) and coordinates (X7, Y12):
- a pair of coordinates (X5, Y1) and coordinates (X5, Y16) and a pair of coordinates (X8, Y1) and coordinates (X8, Y16); and
- a pair of coordinates (X3, Y2) and coordinates (X3, Y15) and a pair of coordinates (X10, Y2) and coordinates (X10, Y15).

By adopting such an arrangement, symmetry with respect to the X direction and the Y direction can be maintained. Further, since a single on-element 11*c* is arranged separated from a pair of on-elements 11*a* adjacent to each other along the Y direction, the uniformity of the phase center spacing when the on-elements 11*a* are grouped can be reduced. The grating lobe can be suppressed and the side lobes level can be followed and suppressed.

Further, the on-elements 11*a* and 11*c* in the left half region and the on-elements 11*a* and 11*c* in the right half region are arranged symmetrically. In the configuration of the present embodiment, in the arrangement of the on-elements 11*a* and the off-elements 11*b*, the densities occupied by the on-elements 11*a* and 11*c* in the central portion of the antenna array 7 are increased, and the densities at the four corners thereof are decreased. If it is determined that N=number, a reference for the central portion of the occupancy density is (N−2)/3+2=(16−2)/3+2≈6 elements, and a reference for the four corners of the occupancy density is (N−2)/3=(16−2)/3≈4 elements.

Specifically, in the 6×6 square region in the central portion of the antenna array 7, the occupancy density of the on-elements 11*a* and 11*c* in the 3×3 square region is between 7/9 and 9/9, that is, more than 75%. On the other hand, the occupancy density of the on-elements 11*a* and 11*c* at the four corners of the antenna array 7 is 4/9, that is, about 44%. The rectangular antenna array 7 has an occupancy density of 5/9, that is, about 56% of the on-elements 11*a* and 11*c* at the center of both ends of the four sides. From the viewpoint of tapering, the design that eliminates the on-elements 11*a* and 11*c* at the four corners is effective. This is because the distance from the central portion of the antenna array 7 is large, so that a large amount of attenuation is required for the variable gain amplifier 13 inside the phase shifter IC 2 of FIG. 2 in order to realize tapering.

As a general comparative example, it is conceivable to randomly arrange the on-elements 11*a*. In this case, the occupancy density of the on-elements 11*a* and 11*c* is basically constant in the entire region. However, assuming that the occupancy density near the center is an average value, the occupancy density is as low as 4/9 to 5/9, that is, 44% to 56%, so that there is a concern that the side lobes level may deteriorate. According to the configuration of this embodiment, since the occupancy density near the central portion is higher than that of the four corners, it is possible to suppress the deterioration of the side lobes level while maintaining the number of on-elements 11*a* and 11*c* arranged.

Further, when the on-elements 11*a* are arranged in the antenna array 7 at the above-mentioned positions, the occupancy ratio of the on-elements 11*a* with respect to the antenna array 7 becomes 60.4%. Further, by grouping two on-elements 11*a* in the Y direction (vertical direction), the occupancy ratio of the on-elements 11*a* that require phase shift control can be reduced to about half. Actually, it was designed to be 33% in consideration of the on-elements 11*c* that are not grouped. This means that control for 192×33%=64 channels is sufficient. For example, when using a phase shifter IC2 for 16 channels, the antenna array 7 can be controlled with only four phase shifters IC2.

Figure 9:
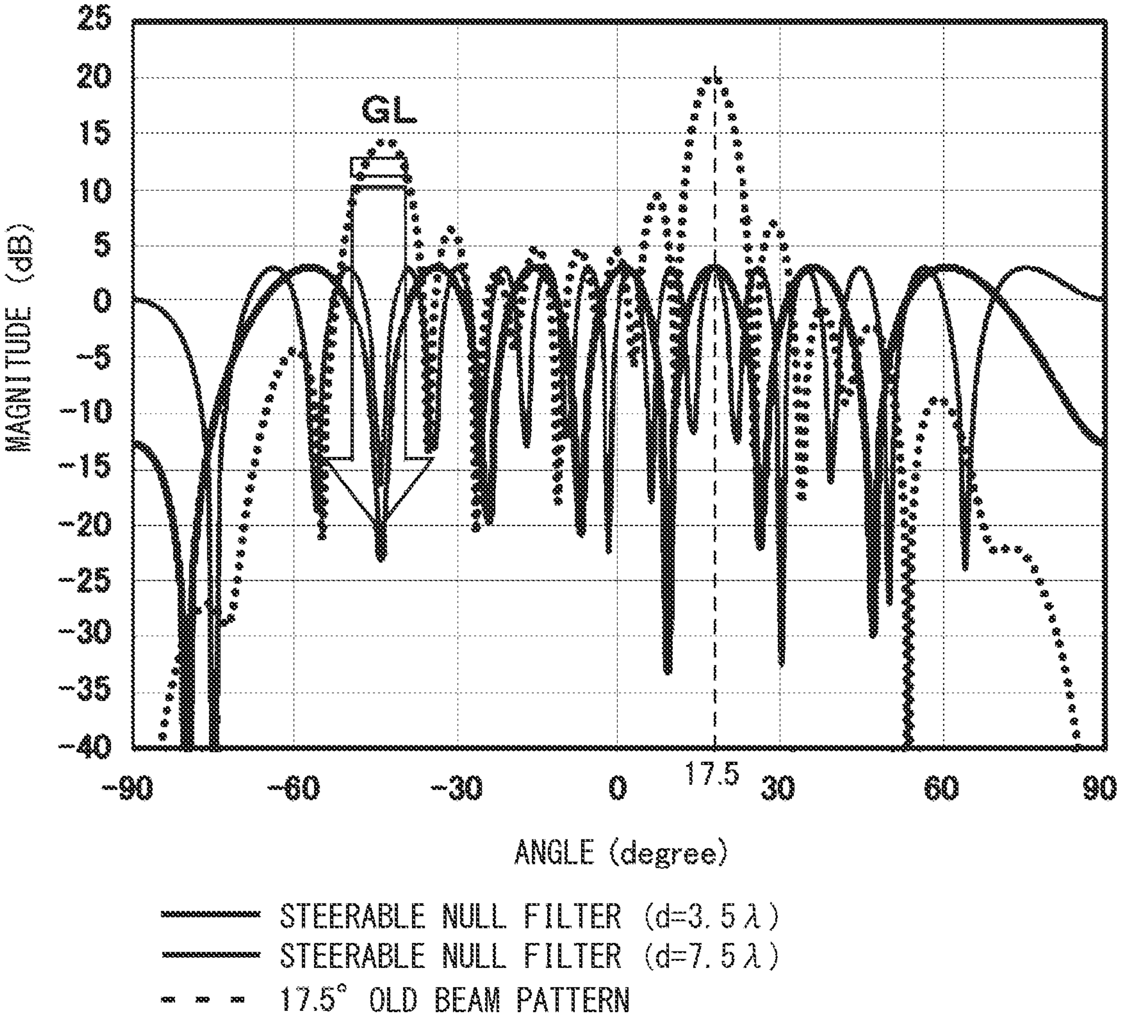
FIG. 9 is simulated beam patterns for two types of null filters steered at 17.5° in E-plane to show nulls at the same angle of the grating lobe according the first embodiment, being simultaneously plotted with a simulated beam pattern for the URA with vertical grouping of adjacent elements steered at 17.5° in E-plane to show grating lobe as a reference.

The simulation results will be described below. The inventor has simulated the structure of the antenna array 7 in which the on-elements 11*a* and 11*c* are arranged as described above. FIG. 9 shows simulated beam patterns for two types of null filters with d=3.5λ and d=7.5λ, which is steered at 17.5° in E-plane to show nulls at the same angle of the grating lobe according the first embodiment, being simultaneously plotted with simulated beam pattern for the URA with vertical grouping of adjacent elements steered at 17.5° in E-plane to show grating lobe as a reference.

By configuring the first or second null filter, the loss of the main beam angle can be minimized as compared with the case of random placement, and the side lobes level and the grating lobe level can be suppressed, and the grading lobe angle can be followed and suppressed.

Figure 10:
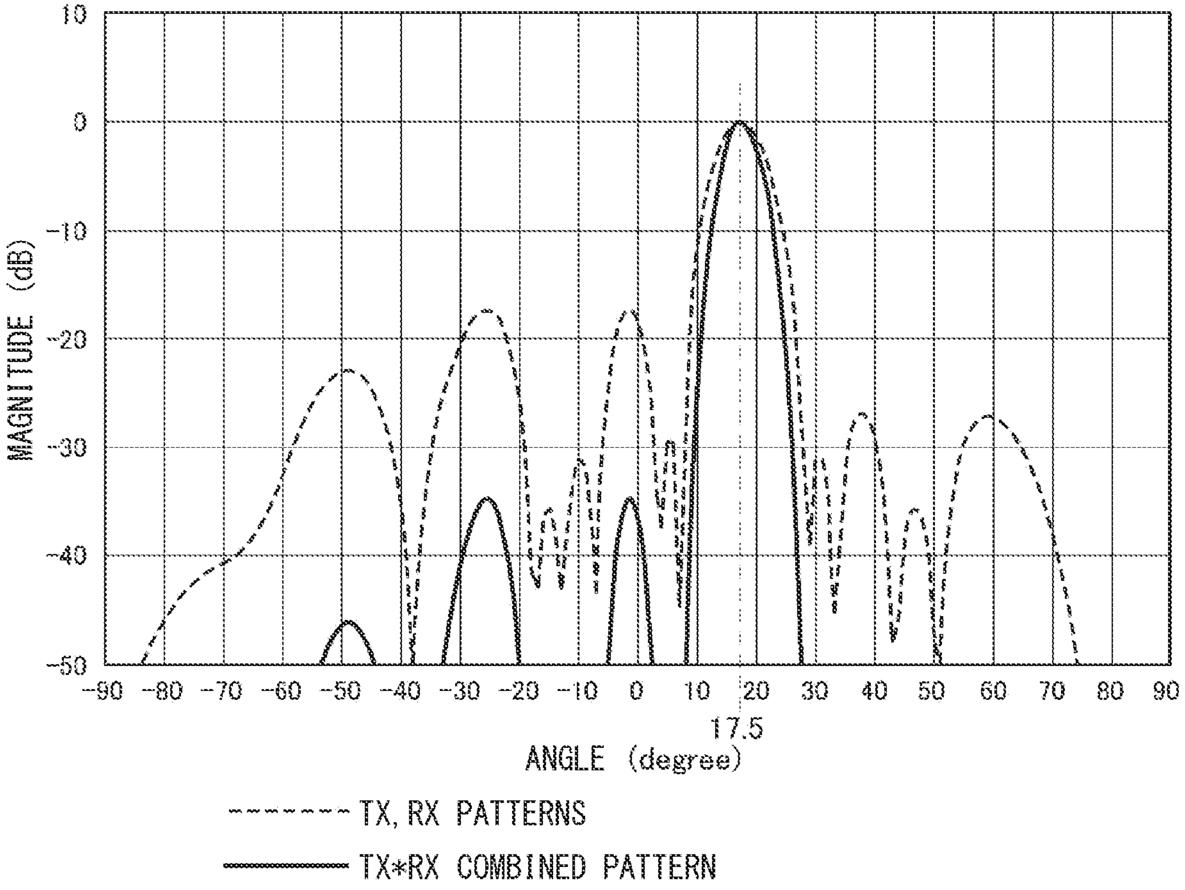
FIG. 10 is a simulated beam patterns for TX and RX (TX=RX in this case) and the combined beam patterns of TX and RX steered at 17.5° in E-plane with the main lobe peak normalized to 0 dB for an antenna array according to the first embodiment.

Further, FIG. 10 shows a simulated beam patterns for TX and RX (TX=RX in this case) and the combined beam patterns of TX and RX steered at 17.5° in E-plane with the main lobe peak normalized to 0 dB for an antenna array according to the first embodiment. As shown in FIG. 10, in the spectrum after TX and RX combined, the grating lobe generated in the vicinity of −43° can be suppressed to −40 dBc or less during the 17.5° vertical scan. Further, the side lobes level can be suppressed to about −35 dBc.

Figure 11:
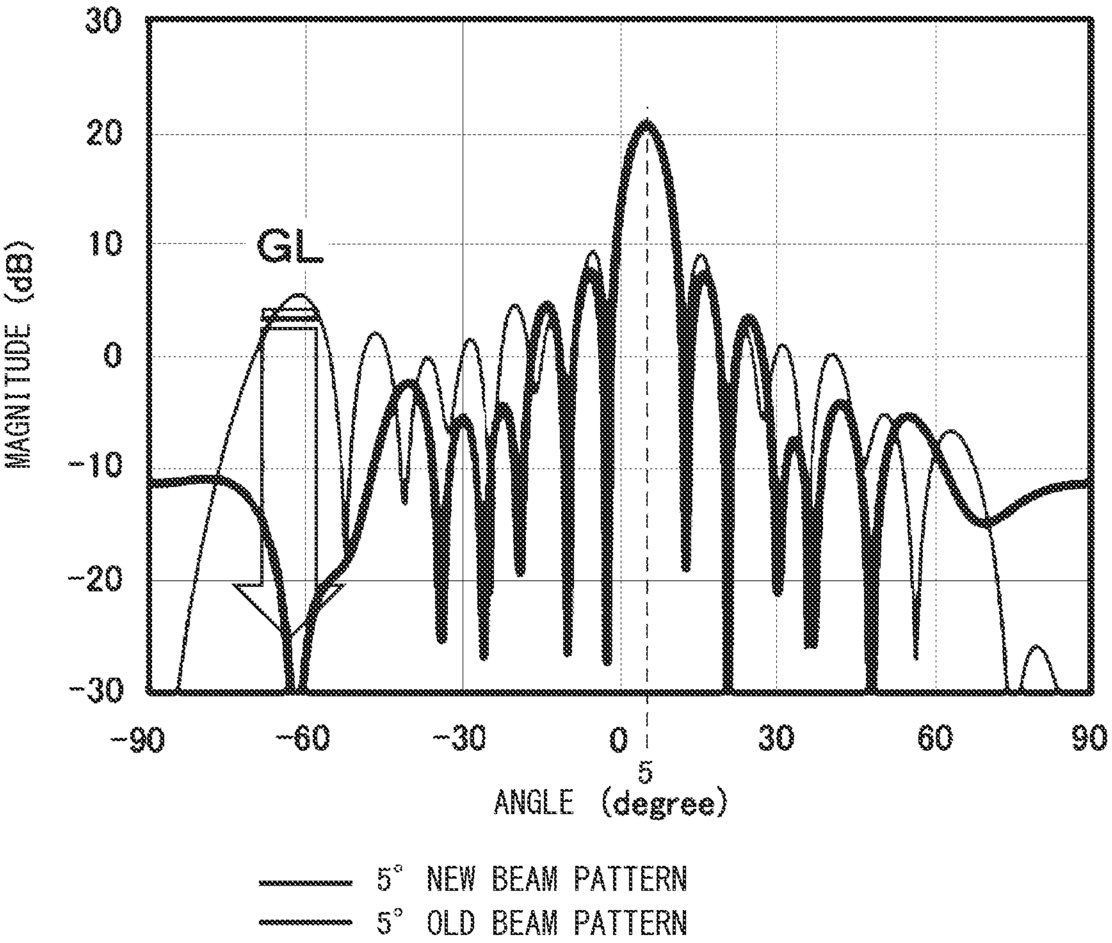
FIG. 11 is a simulated RX beam pattern for the antenna array with three types of null filters in an antenna array 7, being simultaneously plotted with the URA with vertical grouping of adjacent elements according to the first embodiment when the main beam angle is steered at 5° in E-plane.
Figure 12:
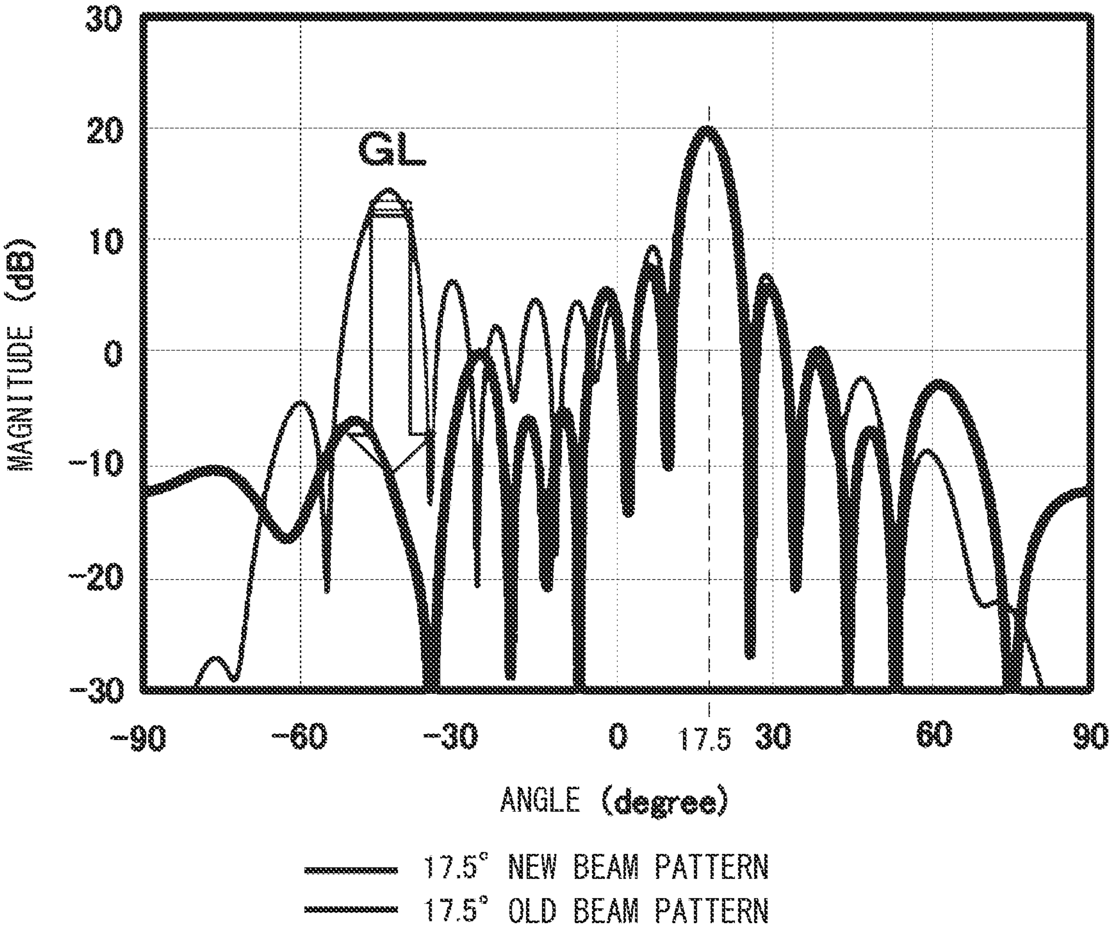
FIG. 12 is a diagram schematically showing simulated RX beam pattern of an antenna array according to the first embodiment when the main beam angle is steered at 17.5° in E-plane, being simultaneously plotted with the URA with vertical grouping of adjacent elements.

Further, FIG. 11 shows a simulated RX beam pattern for the antenna array with null filters, being simultaneously plotted with conventional array with vertical grouping of adjacent elements according to the first embodiment when the main beam angle is steered at 5° in E-plane. FIG. 12 shows diagram schematically showing simulated RX beam pattern of an antenna array according to the first embodiment when the main beam angle is steered at 17.5° in E-plane. All of these cases in FIG. 11 can suppress the side lobes level and the grating lobe level as compared with the case of this random arrangement.

If the grating lobe level remains strongly, in the case of the radar device 1 for vehicle use, when the main beam to be detected is adjusted in the forward direction, it becomes strongly affected by the reflection from the road surface existing in the vertical direction of the installation location of the radar device 1 and the reflection interferes with the received signal. Therefore, by suppressing the grating lobe level, the influence of reflection from the road surface can be suppressed even when applied to the radar device 1, and false detection can be prevented.

FIG. 13 shows transition of the grating lobe generation angle when the angle of the main beam is changed from 0° to 40°, and the simulation result of the grating lobe level. When the angle of the main beam is continuously changed from 0° to 40° by adjusting the phase shift value φ of the phase shifter 14 in the RX phase shift unit 10, the angle at which the grating lobe is generated also changes. However, the grating lobe can be suppressed by following the grating lobe angle due to the influence of the null filter embedded in the two-dimensional array.

Conclusion

According to the present embodiment, since the occupancy density of the on-elements 11*a* near the central portion of the antenna array 7 is higher than the occupancy density of the four corners, the configuration can decrease the number of on-elements 11*a* arranged compared with that of the random arrangement configuration while the deterioration of the side lobes level can be suppressed. Therefore, the configuration can suppress the generation of grating lobes while reducing the number of on-elements 11*a* arranged.

Further, according to the present embodiment, the on-element 11*c* sandwiched by the off-elements 11*b* is arranged to reduce the periodicity of the phase center after the on-elements 11*a* are grouped, and the on-elements 11*c* are arranged line-symmetrically and point-symmetrically at a specific interval. With this configuration, the null filter can be configured and the grating lobe can be followed and suppressed.

According to the present embodiment, in the design of the on-elements 11*a* and off-elements 11*b*, the density of the on-elements 11*a* in the central portion is increased and the density of the four corners is lowered. With this configuration, since the phase shift control can be further simplified, the number of the phase shifters 14 in the circuit IC2 can be reduced and the side lobes level can be reduced. Further, by grouping the adjacent on-elements 11*a*, the configuration can collectively control a plurality of on-elements 11*a* corresponding to the same phase shifter 14, and the number of phase shifters 14 installed can be reduced to about half. The grating lobe generated at that time can be suppressed at all required scan angles.

Second Embodiment

Figure 14:
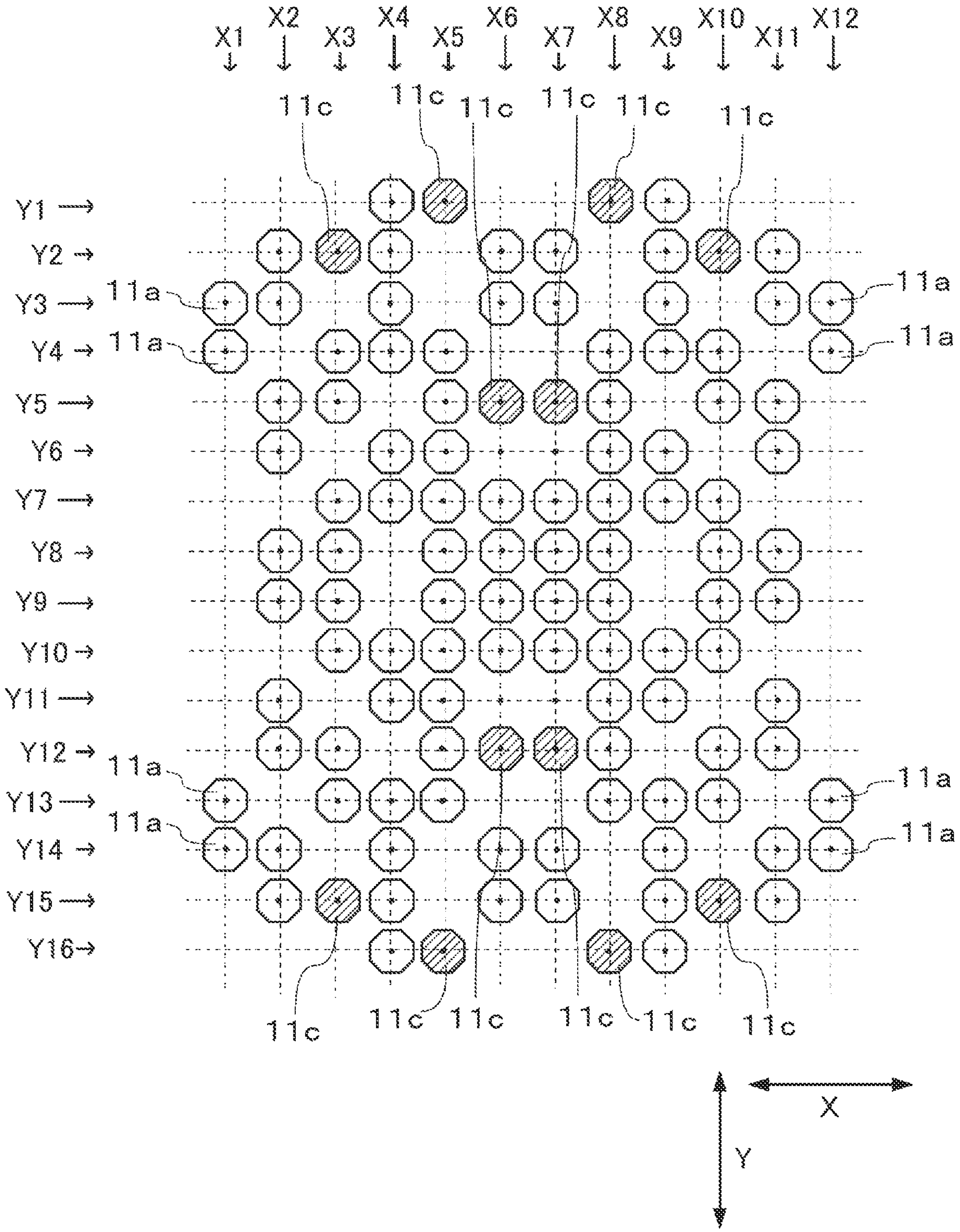
FIG. 14 is a diagram schematically showing an arrangement of on-elements for an antenna array according to a second embodiment.

A second embodiment will be described with reference to FIG. 14. As shown in FIG. 14, the shapes of the on-elements 11*a* and 11*c* may be formed into a shape other than a quadrangle, for example, a polygonal shape such as an octagon. FIG. 14 shows only the on-elements 11*a* and 11*c* configured in an octagonal shape, respectively, and the off-elements 11*b* and the dummy elements 11*d* are not shown. The second embodiment provides the similar effect to the embodiment described above. Further, the shapes of the on-elements 11*a* and 11*c* may be different from each other.

Third Embodiment

Figure 15:
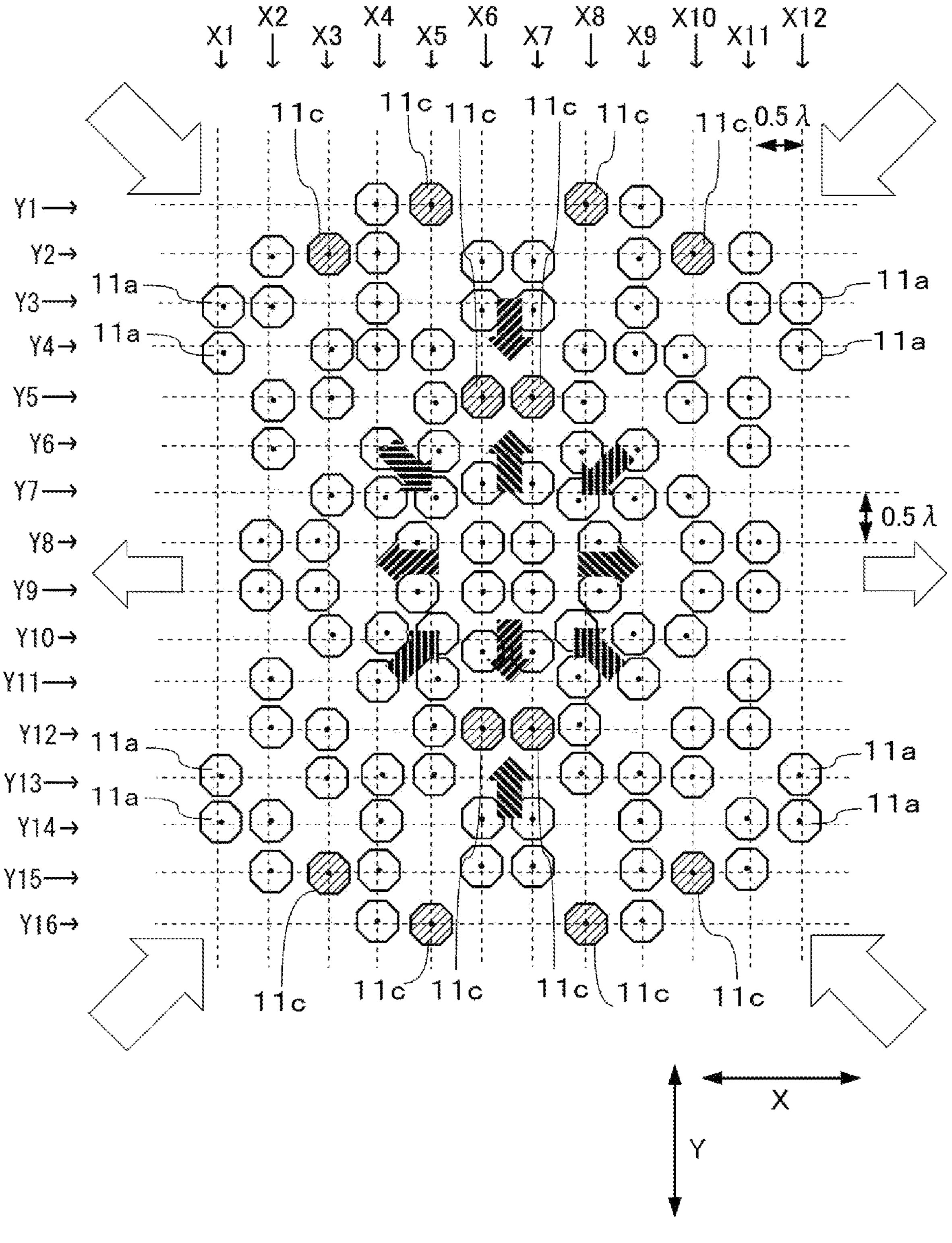
FIG. 15 is a diagram schematically showing an arrangement of on-elements for an antenna array according to a third embodiment.

A third embodiment will be described with reference to FIGS. 15 and 16. FIG. 15 shows that the on-elements 11*a* and 11*c* are configured in an octagonal shape as in the second embodiment. As shown in FIG. 15, the on-elements 11*a* have coordinate centers that are arranged in at least a part of the two-dimensional grid point array at a predetermined regularity. It is desirable that the coordinate center is arranged two-dimensionally shifted from the position of the grid point to the top, bottom, left or right from the center of the grid point array. It is desirable that the on-element 11*c* is fixedly arranged in the grid point array.

FIG. 15 shows desirable directions for shifting the on-elements 11*a* from the center of the grid point array. It is desirable that the on-elements 11*a* arranged on the center side in the X direction are shifted outward along the X direction by a predetermined interval of less than the grid point interval of 0.5λ. Further, it is desirable that the on-elements 11*a* arranged on the center side in the Y direction are shifted along the Y direction by a predetermined interval of less than the grid point interval of 0.5λ so as to be directed toward the on-element 11*c*.

Further, as shown in the direction of the arrow in FIG. 15, it is desirable that the on-elements 11*a* in the diagonal direction of XY is shifted toward the center direction by a predetermined interval of less than the grid point interval of 0.5λ. It is desirable that these shift intervals are set to line symmetry in the X and Y directions, that is, point symmetry at the center position by the same interval. It is conceivable that the on-elements 11*a* are to be slightly shifted to an angle that fills the region of the off-element 11*b* so as to break the periodicity of the phase center. As a result, this configuration can be expected that the grating lobe can be suppressed.

Figure 16:
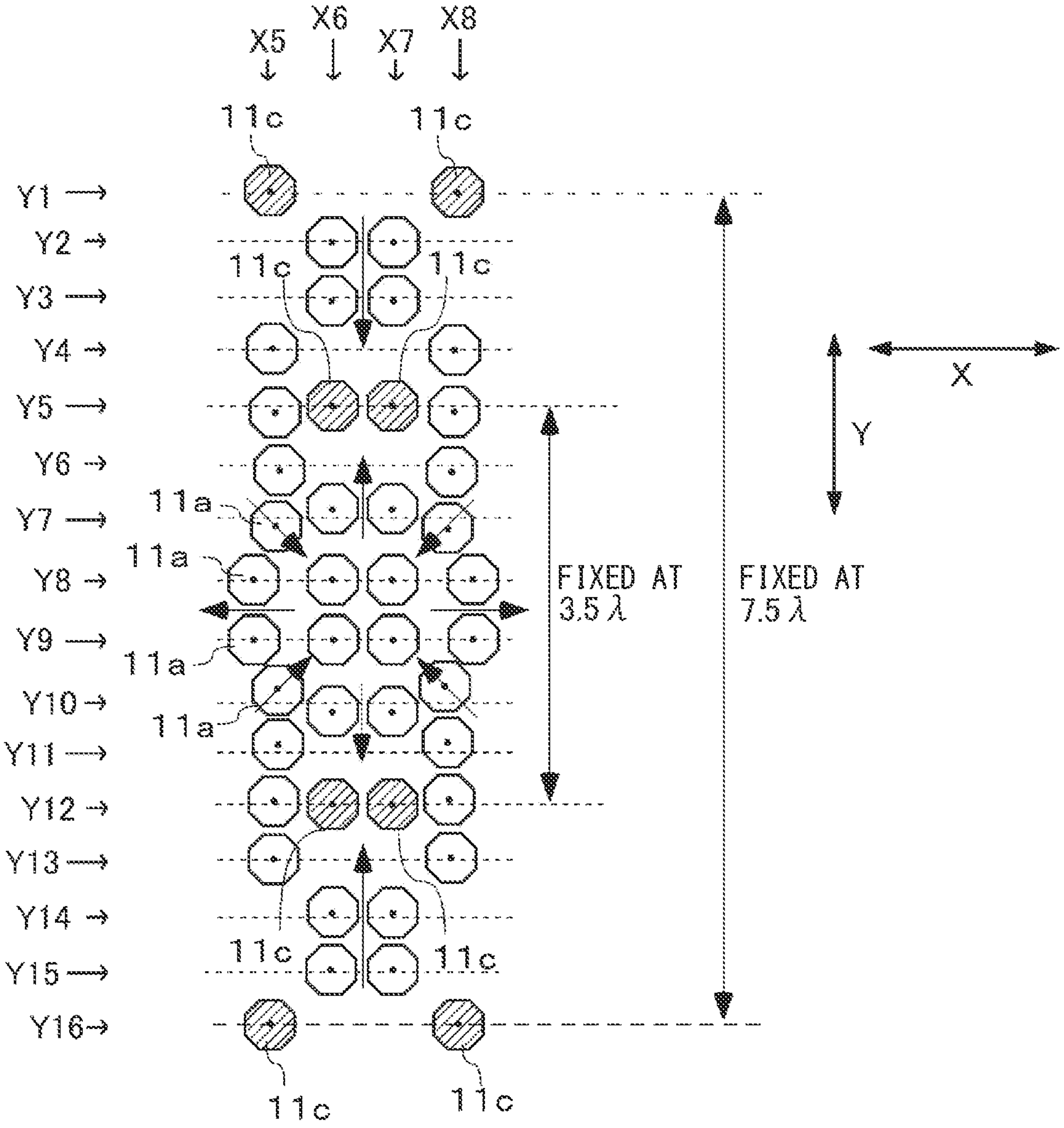
FIG. 16 is a diagram schematically showing a part of the arrangement of the on-elements for the antenna array according to the third embodiment.

Further, FIG. 16 shows the arrangement spacing of the on-elements 11*a* and 11*c* of the four rows X5 to X8 on the center side in the X direction. The Y-direction spacing of the on-elements 11*c* in the rows X6 and X7 is fixed at 3.5λ. The Y-direction spacing of the on-elements 11*c* in the rows X5 and X8 is fixed at 7.5λ. As a result, the characteristic of the on-element 11*c* as a null filter can be maintained.

Other Embodiments

The present disclosure is not limited to the embodiment described above but can be implemented in various variations and can be applied to various embodiments without departing from the gist thereof. For example, the present disclosure can be modified as follows.

The two on-elements 11*a* are grouped in the Y direction, that is, in the vertical direction, however the present disclosure is not limited thereto. Two on-elements 11*a* may be grouped in the X direction, that is, in the horizontal direction. Although the embodiment in which two single on-elements 11*c* are arranged so as to be separated in the Y direction, that is, in the vertical direction, is described, but the present disclosure is not limited to thereto. Four or more on-elements 11*c* may be arranged in a state of being separated in the Y direction.

The present invention has been described in accordance with the embodiment described above. However, it is to be understood that the present invention is not limited to the embodiment and structure. The present disclosure encompasses various modifications and variations within the scope of equivalents. In addition, various modes/combinations, one or more elements added/subtracted thereto/therefrom, may also be considered as the present disclosure and understood as the technical thought thereof.

What is claimed is:

1. An antenna array for a high frequency device comprising:

a plurality of antenna elements used for a radar device and arranged in a two-dimensional array in a predetermined area, wherein the plurality of antenna elements includes on-elements electrically connected to a phase shifter, and the on-elements are arranged such that density of the on-elements at a center portion in the two-dimensional array is high and density of the on-elements at four corners in the two-dimensional array is low.

2. The antenna array according to claim 1, wherein the on-elements adjacent to each other in a vertical or horizontal direction in the two-dimensional array are defined as first on-elements, the first on-elements adjacent to each other are grouped and controlled by the phase shifter.

3. The antenna array according to claim 2, wherein the plurality of antenna elements includes off-elements that is are not electrically connected to the phase shifter, a single on-element electrically connected to a single phase shifter is defined as a second on-element, and the second on-elements are arranged so as to be separated from each other in a same direction as a direction toward which the first on-elements are grouped.

4. The antenna array according to claim 3, wherein the second on-elements are provided as a null filter and arranged line-symmetrically with respect to a center of the antenna array at an interval of (0.5+m) λ (provided that m=1, 2, . . . ).

5. The antenna array according to claim 4, wherein, in the interval of (0.5+m) λ, a value of m is equal to or more than three.

6. The antenna array according to claim 4, wherein a plurality of sets of the second on-elements are provided, and in each of the plurality of sets of the second on-elements, a value of m is different in the interval of (0.5+m) λ.

7. The antenna array according to claim 4, wherein the second on-elements are arranged point-symmetrically with respect to the center of the antenna array at vertexes of a two-dimensional quadrangle.

8. The antenna array according to claim 1, wherein the on-elements adjacent to each other in a vertical or horizontal direction in the two-dimensional array are defined as first on-elements, the first on-elements have coordinate centers that are arranged in at least a part of a two-dimensional grid point array at a predetermined regularity, and the coordinate center is shifted from a grid point to a top, bottom, left or right.

9. The antenna array according to claim 1, wherein the on-element has a polygonal shape other than a quadrangle.

10. The antenna array according to claim 1, wherein dummy elements are arranged on an outermost periphery of the two-dimensional array.

11. The antenna array according to claim 1, wherein line lengths of transmission lines connecting an IC pad including the phase shifter and on-elements are equal to each other or relationship of p×λ (where p is an integer) to each other in order to align the phase for all channels.

12. The antenna array according to claim 1, wherein the antenna array is provided by a hybrid radar architecture having a plurality of mixers.

13. The antenna array according to claim 1, wherein the antenna array is applied as a phased array antenna of a transmitter unit and a receiver unit of the radar device.

14. The antenna array according to claim 1, wherein the on-elements adjacent to each other in a vertical direction in the two-dimensional array are defined as first on-elements, the first on-elements adjacent to each other are grouped and controlled by the phase shifter, the plurality of antenna elements includes off-elements that are not electrically connected to the phase shifter, a single on-element electrically connected to a single phase shifter is defined as a second on-element, the second on-elements are arranged so as to be separated from each other in a same direction as a direction toward which the first on-elements are grouped, the second on-elements are provided as a null filter and arranged line-symmetrically with respect to a center of the antenna array at an interval of (0.5+m) λ (provided that m=1, 2, . . . ).

15. The antenna array according to claim 1, wherein the plurality of antenna elements is provided as either one of a solely transmitter unit or a solely receiver unit of the antenna array.

16. The antenna array according to claim 1, wherein the plurality of antenna elements are provided on only one side of the phase shifter.

17. The antenna array according to claim 1, further comprising a transceiver circuit configured to execute control functions for the phase shifter, wherein the plurality of antenna elements are provided on a first side of the phase shifter, and the transceiver circuit is provided on a second side of the phase shifter different from the first side of the phase shifter.

18. The antenna array according to claim 1, wherein the plurality of antenna elements includes off-elements that are not electrically connected to the phase shifter, and dummy elements that are not electrically connected to the phase shifter, and every location in the two-dimensional array is filled with either one of the on-elements, one of the off-elements, or one of the dummy elements.

* * * * *